Sept. 20, 1966  R. H. FOLTZ, JR  3,273,688
VENEER DRYER FEEDER
Filed Jan. 22, 1964  5 Sheets-Sheet 1
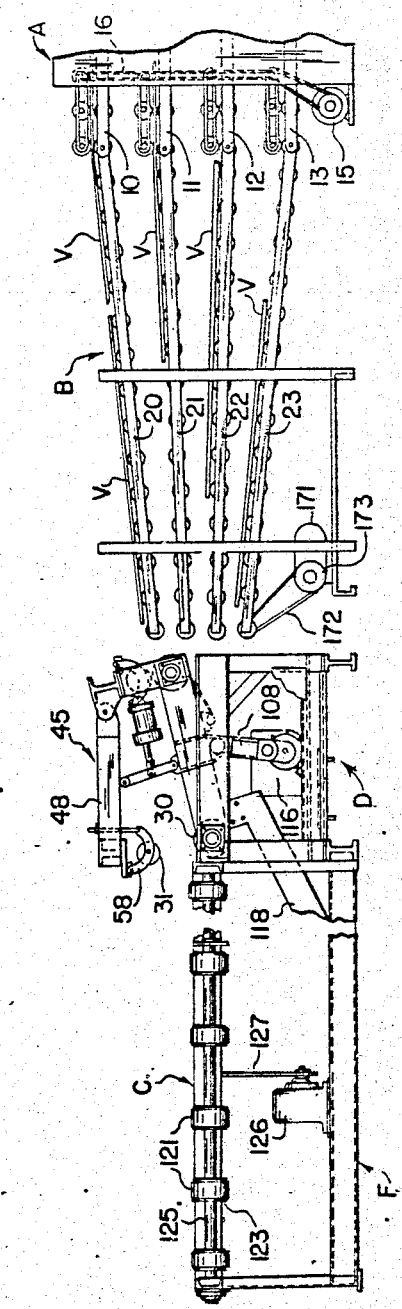
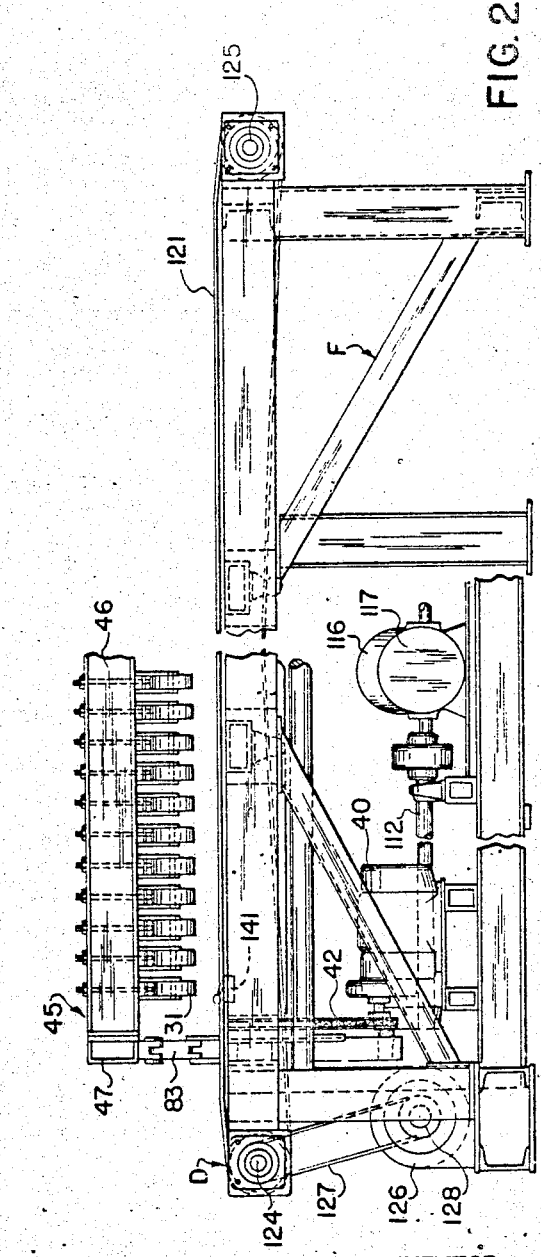
INVENTOR.
ROGER H. FOLTZ JR.
BY Williams, David,
Hoffmann & Yount
ATTORNEYS

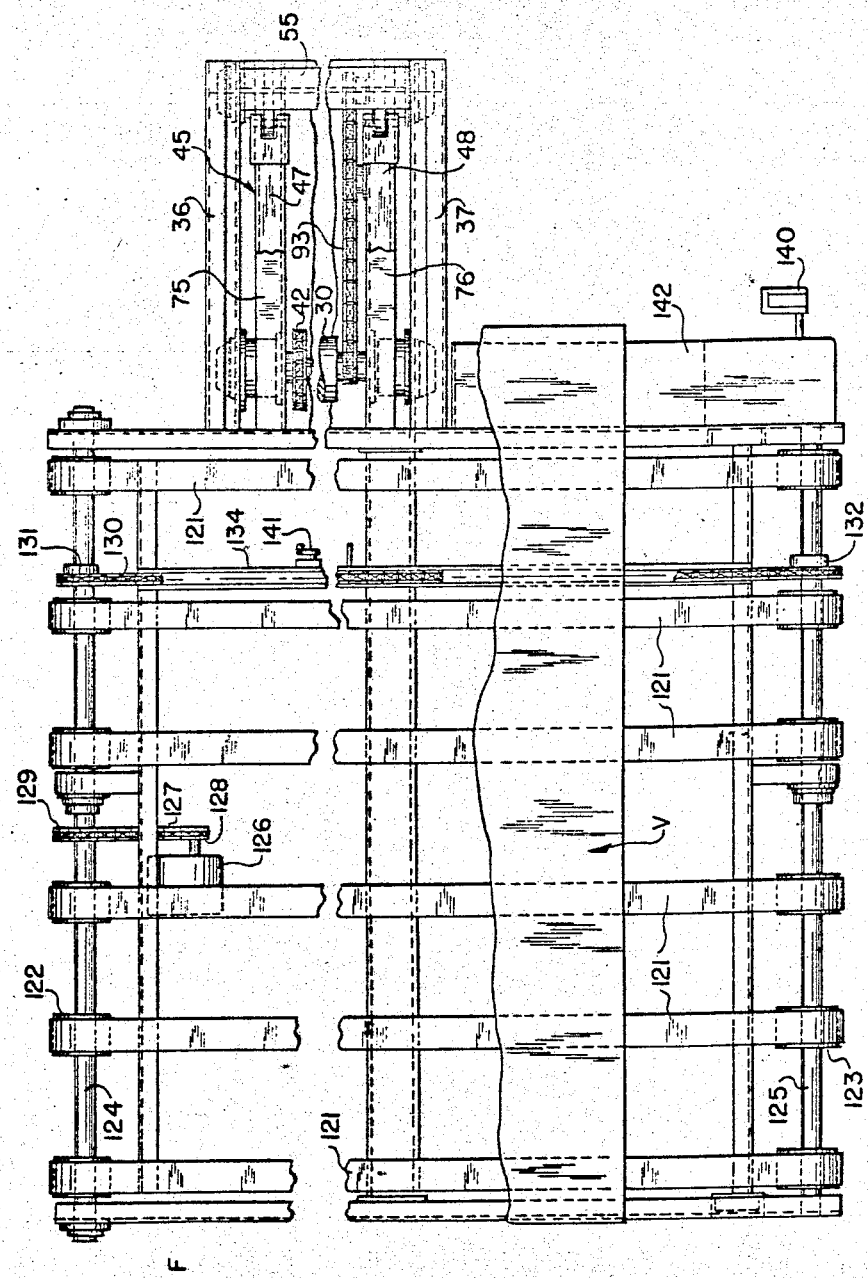

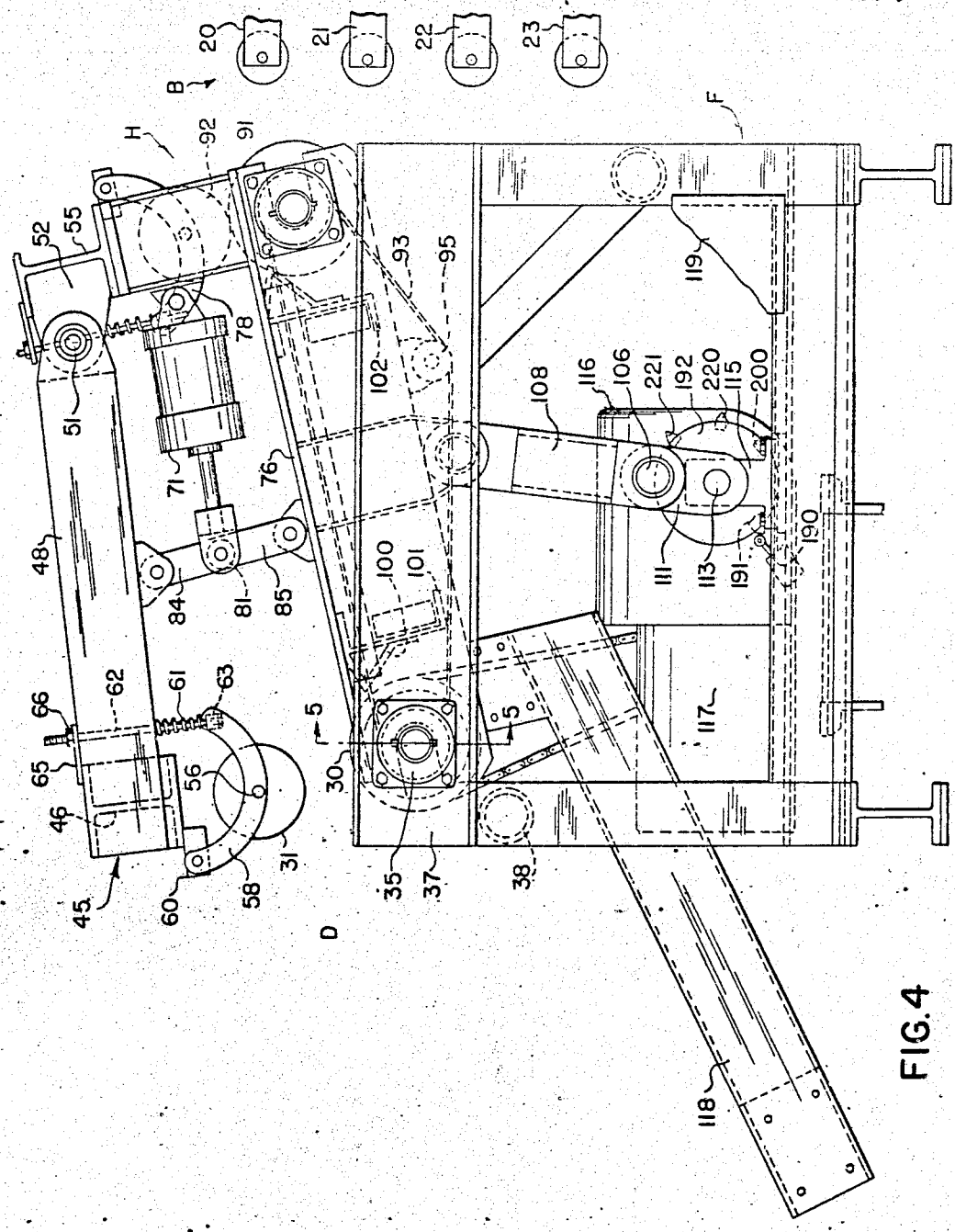

United States Patent Office 3,273,688
Patented Sept. 20, 1966

3,273,688
VENEER DRYER FEEDER
Roger H. Foltz, Jr., Painesville, Ohio, assignor to The Coe Manufacturing Company, Painesville, Ohio, a corporation of Ohio
Filed Jan. 22, 1964, Ser. No. 339,485
15 Claims. (Cl. 198—20)

The present invention relates to material handling and more particularly to apparatus for handling material in sheet form, especially veneer and like material which is relatively light and apt to be warped or otherwise irregular in shape and of varying width.

As veneer is peeled from logs by a veneer lathe, referring particularly to the usual practices in the plywood industry, it is collected on one or more selectively driven tiered conveyors, sometimes referred to as "trays," from which the veneer is subsequently removed and passed through a so-called "clipper" where defective parts are cut out and the remainder cut into pieces, hereinafter sometimes referred to as "veneers," having a maximum width of six feet plus trim. Some of the veneers may be as small as three inches in width. The lengths of the veneers are the same as the lengths of the logs from which they are peeled and which vary from about four and one-half feet up to sixteen feet and more.

The veneers are carried or conveyed away from the clipper in side-by-side relation by a conveyor, commonly called the "green" table. As the veneers travel along the green table the scrap veneers are pulled off the table by hand and sent to a chipper. The other veneers are pulled off the green table by hand, sorted as to various characteristics, such as, species of wood, heart or sap wood, width, quality, etc., and stacked for subsequent drying. Prior to drying the veneers are usually quite moist and are referred to as "green."

The veneers are dried in a multiple-deck dryer comprising a plurality of tiered driven conveyors into the various decks of which the veneers are fed by hand with or without the assistance of mechanical feeders. The dryers are fifty or more feet long, approximately fourteen feet wide and preceded by a multiple-deck feed conveyor section comprising a plurality of tiered driven conveyors, the number of which is equal to the number of decks or conveyors in the dryer. The dryer conveyors are in effect continuations of the conveyors of the feed conveyor section and the ends of the conveyors of the feed conveyor sections adjoining the dryers align with the dryer conveyors. The other ends of the conveyors of the feed conveyor sections converge so as to be closer together than the decks of the dryers thus facilitating the insertion of veneers therein.

The mechanical feeders currently employed to assist the feeding of veneers to the various tiered conveyors of the dryers or feed sections, as the case may be, are located in front of the tiered conveyors to be fed. A stack or stacks of veneers to be dried are placed in front of each feeder with the veneers extending lengthwise with respect to the direction in which they will travel through the feeder, etc.

An operator then pushes the top layer of veneers off the stack or stacks, as the case may be, forward a short distance thereby moving the leading ends of the veneers into a position between top and bottom feed roll means which at the time are inoperative insofar as their advancing the veneers. In timed relation to the speed of the conveyors of the equipment being fed the feed roll means is periodically actuated to draw the top layer of veneers from the stack or stacks which layer at the time has its forward ends between the top and bottom feed roll means of the feeder. The charge or load of veneers so withdrawn from the top of the stack or stacks are advanced or fed over or along a vertically oscillatable conveyor means and into a driven set of pinch rolls adjacent to and forming a part of the discharge or feed end of the oscillatable conveyor which pinch rolls continue the movement of the veneers and push them into the deck of the dryer or feed conveyor section with which they are aligned, it being understood that the operation of the feed roll means and the vertical movement of the discharge end of the conveyor means of the feeder are carried out in such a manner that the various decks of the apparatus being fed are fed or loaded sequentially.

As previously mentioned, dryers currently used in the plywood industry are fourteen or approximately fourteen feet wide and the veneers to be dried may be as long as sixteen or more feet. When the dryers are being fed with the assistance of mechanical feeders of the type referred to the required manual handling of the veneers must be performed from one end, that is, the end away from the feeder. Having in mind that the veneers are always more or less warped and the stacks are more or less irregular, the inaccessibility of the veneers to the operators, except for the end veneers, obviously results in improper or defective loads of veneers being fed to the dryer, for example, loads in which some of the veneers overlap, at least to some extent, or in which there are excessive voids between adjacent veneers. Defective loads interfere with the efficiency and proper operation of the dryer.

Having the foregoing in mind, one of the principal objects of this invention is the provision of equipment adapted to feed veneers, and more particularly their hardwood veneers, into a multiple-deck apparatus either directly from the green table or a conveyor associated therewith or from a stack of veneers whereby both ends of the veneers will be accessible to operators, as a load or charge is being formed preparatory to its being fed to the multiple-deck apparatus.

A more specific object of the invention is the provision of equipment adapted for feeding veneers, and more particularly their hardwood veneers, to a multi-deck apparatus having a plurality of tiered power driven conveyors which equipment includes feed means comprising vertically spaced roller means adapted to be intermittently actuated to advance a load or charge of veneers, and power driven conveyor means extending lengthwise of said feed means for conveying veneers lengthwise of said feed means with their one ends between the vertically spaced roller means in combination with vertically oscillatable conveyor means for directing and feeding the loads of veneer advanced by the feed means into the decks of the multiple-deck apparatus sequentially.

The invention resides in certain constructions and combinations and arrangements of parts, and further objects and advantages will be apparent to those skilled in the art to which the invention relates from the following description of the preferred embodiment described with reference to the accompanying drawings forming a part of this specification and in which:

FIG. 1 is a side elevational view of equipment embodying the present invention;

FIG. 2 is an enlarged fragmentary front elevational view of the equipment shown in FIG. 1, looking from the left;

FIG. 3 is an enlarged fragmentary plan view, with portions broken away, of equipment shown in FIG. 1;

FIG. 4 is an enlarged side elevational view of the center portion of the equipment shown in FIG. 1;

Figure 5:
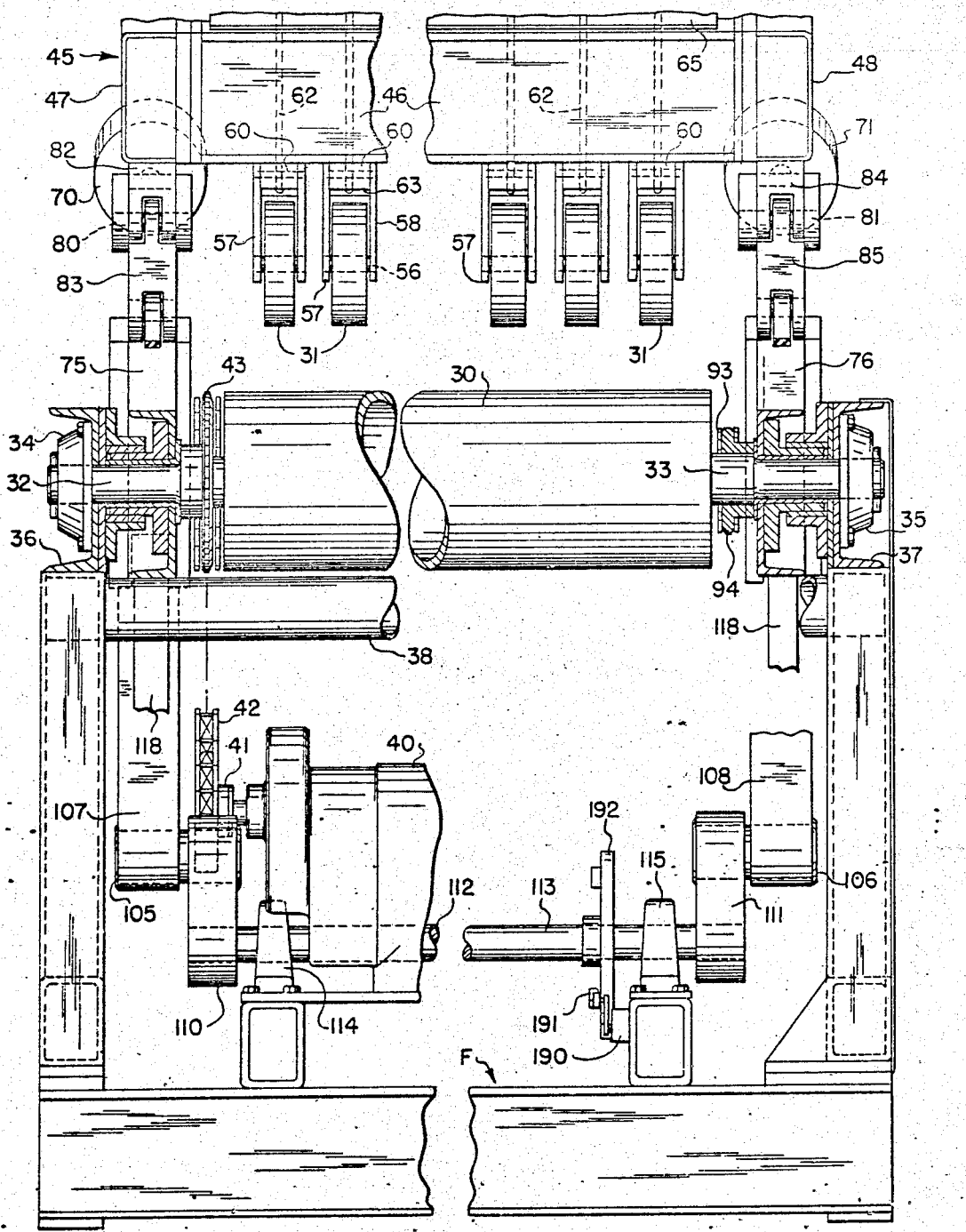
FIG. 5 is a front elevational view of the apparatus shown in FIG. 4 looking from the left, with portions in section approximately on the line 5—5.
Figure 6:
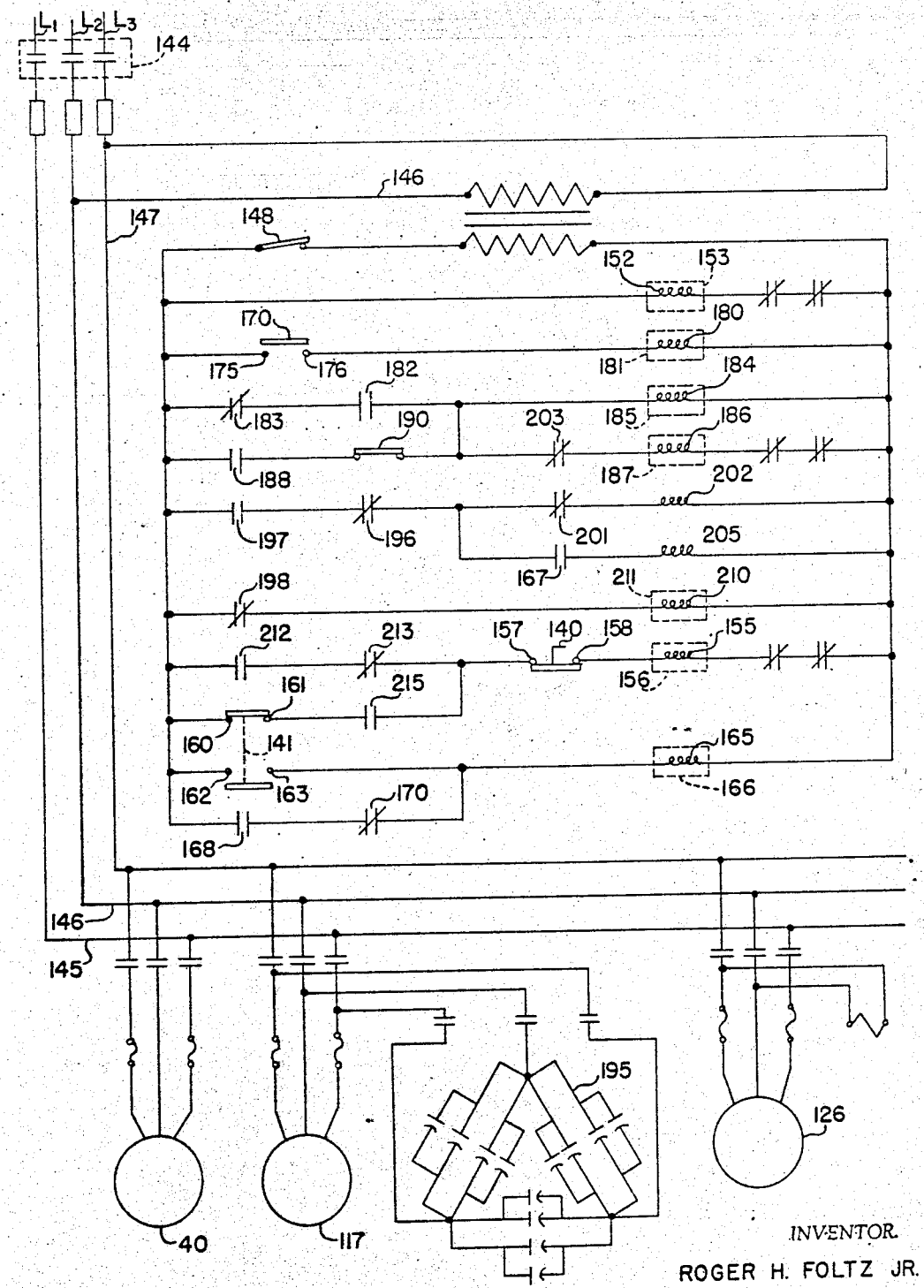
FIG. 6 is a schematic wiring diagram of the electrical control circuits.

Although the illustrative embodiment of the invention will be described in detail, it is to be understood that the invention is not limited to the construction and arrangement of the parts shown and described, but is capable of being otherwise embodied and of being practiced and carried out in various ways. It is also to be understood that the phraseology or terminology employed herein is for the purpose of description and not of limitation, and that there is no intention to thereby limit the invention beyond the requirements of the prior art.

Referring to the drawings, the reference character A designates the infeed end of a veneer dryer of commercial construction. The dryer A is not herein shown and described in detail because suitable dryers are well known in the art and the dryer per se forms no part of the present invention. The dryer shown is of the roll type and has four decks 10 to 13, that is, four vertically spaced or tiered power driven roll type conveyors. The rolls of the respective decks are driven at a predetermined uniform speed by suitable means, such as an electric motor 15 connected thereto by a sprocket chain drive means 16, and operate to move sheets of veneer, indicated by the reference character V through the dryer. The respective decks of the dryer A project a short distance in front of the feed end of the dryer proper and each deck is provided with a pair of top or hold down rolls, which cooperate with the bottom or carrying rolls at the left-hand ends of the decks to guide and feed the veneer into the dryer proper. The pairs of top rolls referred to are carried by arms pivoted at their right-hand ends, as viewed in FIG. 1, on transversely extending shafts located above the center planes of the respective decks and are preferably driven from the drive for the dryer conveyors by the suitable sprocket chain drives. Gravity holds these top rolls as well as the top rolls in the dryer proper in engagement with the top sides of the sheets of veneer passing thereunder.

The decks 10 to 13 of the dryer A are spaced a considerable distance one above the other and the dryer is preceded by a multiple deck roll type conveyor section designated generally by the reference character B and comprising a plurality of roll conveyor decks 20 to 23. The ends of decks of the conveyor section B adjacent to the dryer are pivotally connected to and align with the dryer decks and the rolls thereof are driven from the drive for the decks of the dryer so that veneer thereon is moved to the dryer at the same speed at which veneer moves through the dryer. The ends of the decks of the conveyor section B remote from the dryer converge so as to facilitate the feeding of veneer thereto.

Loads or charges of veneer, usually consisting of three or more veneers assembled into a load or charger on a transfer section or table designated generally as C are fed sequentially into the various decks of the conveyor section B by a feed section designated generally as D located between the entrance end of the conveyor and transfer section B and C, respectively, of the equipment. The feed section D comprises vertically positioned and normally spaced infeed pinch rolls, the bottom one of which is a continuous roll 30, preferably rubber covered, and the upper roll assembly of which comprises a plurality of narrow rubber tired or covered wheels 31. The bottom roll 30 is rotatably supported by the projection of shafts 32, 33, see FIG. 5, at opposite ends thereof into suitable bearings 34, 35 bolted to opposite end portions 36, 37 of a stationary frame structure, designated generally by the reference character F, and built up of suitable structural members, plates, etc., including a tube 38 welded or otherwise secured together. The roll 30 is continuously driven by an electric motor 40 having a gear reduction formed as a part thereof the output shaft of which is provided with a driving sprocket 41 connected by a sprocket chain 42 to a driven sprocket 43 keyed to the right-hand shaft 32 of the roll 30.

The upper roll assembly of the feed section C comprises the rubber-tired or covered wheels or narrow rollers 31, previously referred to carried by the left-hand or movable end of a vertically oscillatable lever assembly 45. The frame of the lever assembly 45 is generally U-shaped in plan and includes a transversely extending I-beam 46 the opposite ends of which are connected to and carried by side members 47, 48 extending from the I-beam toward the right. The free or right hand ends of the side members 47, 48 are pivoted by stud shafts 51 to suitable brackets 53 fixed to a transversely extending I-beam 55 forming a part of the frame assembly of a vertically oscillatable conveyor or tipple assembly H adjacent to its right hand or movable end, which is the end adjacent to the conveyor section B.

Each of the rolls 31 which form a part of the lever assembly 45 is rotatably supported on a stud shaft 56 fixedly secured in a pair of arcuate-shaped lever members 57, 58, the left-hand ends of which are pivotally connected to brackets 60 welded to the bottom flange of the I-beam 46. The opposite ends of each pair of levers 57, 58 are spring biased in a counterclockwise direction about their pivoted connection to the brackets 60 by a compression spring 61 on a rod 62. The lower end of each of the rods 62 is fixed to a member 63 pivotally connected to the right-hand ends of the levers 57, 58. The upper ends of the rods 62 project through suitable holes in a plate 65 welded to the top flange of the I-beam 46 and are adjustably connected thereto by nuts 66 threaded thereon above the plate 65. The springs 61 are interposed and compressed between the members 63 to which the free or movable ends of the members 57, 58 are connected and the underside of the plate 65. The nuts 66 on the rods being above the plate 65 limit movement of the levers 57, 58 and in turn the rolls 31 toward the roll 30 while permitting movement in the opposite direction. The construction is such that the rolls 31 are permitted to move upwardly against the force of the springs 61 when the lever assembly 45 is moved in a downwardly direction to engage the rolls 31 with the roll 30 or the veneer thereabove as the case may be.

The lever assembly 45 is adapted to be oscillated to move the left-hand end thereof, as viewed in FIG. 4, including the rolls 31 carried thereby, toward and from the rolls 30 by a pair of fluid actuated, reciprocating-type double acting motors 70, 71 one at either side of the lever assembly and located underneath each of the side members 47, 48 of the lever assembly 45 and above the side members 75, 76 of the conveyor assembly H. The cylinder elements of the motors 70, 71 are pivotally connected to brackets 78 forming a part of the frame of the oscillatable or tipple conveyor assembly H, and the piston rods of the motors are pivotally connected as by pins 80, 81 to toggle links or levers 82, 83 and 84, 85, respectively, pivotally connected to brackets fixed to the underside of the side members 47, 48 of the lever assembly 45 and brackets connected to the upper side of the side members 75, 76 of the oscillatable conveyor assembly H. The construction is such that as the motors 70, 71 are reciprocated, the lever assembly 45 is oscillated about its pivoted connection with the frame of the conveyor or tipple assembly H and the rolls 31 carried by the lever assembly are moved toward and from the roll 30. The lever assembly 45 is normally in its raised position, that is, the position shown with the rolls 31 out of engagement with the roll 30.

The frame assembly of the vertically oscillatable conveyor or tipple H, like the frame assembly of the lever assembly 45, is generally U-shaped in plan but has its sides or tines extending in the opposite direction, that is, toward the left as viewed in FIGS. 1 and 4. The free ends of its side members 75, 76 are pivotally connected to the stud shafts 32, 33 of the roll 30. The right-hand or outfeed end of the conveyor or tipple assembly H includes pinch roll type feed mechanism similar to the feed mechanism at the left-hand or infeed end thereof except that the upper roll assembly including rolls 91 corresponding to the rolls 31 at the entrance end is not oscillatable toward and from the bottom roll 92 corresponding to the roll 30, that is, the short rolls or rollers 91 are in continuous engagement with the bottom roll 92 or material passing between the bottom roll and the rollers of the top roll assembly. It is understood, of course, that the rolls 91 are yieldable upon the passage of material therebetween and the bottom roll 92. The bottom roll 92 is driven from the bottom roll 30 by a sprocket chain 93 encircling a driven sprocket 94 on the shaft 33 of the roll 30 and a similar sprocket on the corresponding shaft of the roll 92. The sprocket chain 93 passes about an idler sprocket 95 adjustably connected to the underside of the end member 76 of the conveyor tipple assembly H thereby providing a means for adjusting the tension of the chain.

In order to convey and guide the veneer from the infeed mechanism or rolls 30, 31 to the outfeed mechanism or rolls 91, 92, the oscillatable conveyor H includes a plate 100 connected to the side members 75, 76 of the conveyor assembly and channel members 101, 102 extending between the side members. The plate 100 spans the space between the feed rolls 30 and 92, and at least the edge thereof nearest the roll 30 is preferably inclined downwardly to assist in guiding the lead ends of veneers onto the plate. The top of the plate 100 may be substantially in line with the tops of the rolls 30, 92, as shown in FIG. 4, or spaced below the tops of the rolls, as desired. The oscillatable conveyor assembly H, shown, is somewhat similar to the corresponding part of the apparatus shown in Worthington Patent No. 3,061,065 and is intended to feed veneers, the lengths of which are at least as great as the distance between the infeed and outfeed sets of feed rolls 30, 31 and 91, 92. Alternatively, the infeed and outfeed rolls may be spaced further apart than the length of the veneers to be fed. In this case a power-drive conveyor, for example, such as the belt conveyor shown in Parker Patent No. 2,649,182 may be employed between the infeed and outfeed sets of rolls to guide and convey the veneers from the infeed to the outfeed rolls. It is also to be understood that feed roll mechanisms may be employed in place of the particular feed roll mechanisms of the preferred embodiment, for example, feed roll mechanisms similar to those shown in the aforesaid Parker patent, Beckley No. 2,799,381, Jeddeloh No. 2,876,009, and others.

The conveyor or tipple assembly H is oscillated about the axis of rotation of the roll 30 to align the path traveled by the material through the discharge rolls 91, 92 at the movable end of the assembly with the various decks of the conveyor section B by rotatable cranks or eccentric pins 105, 106 located at opposite sides of the apparatus and underneath the side members 75, 76 of the frame of the conveyor assembly H and connected thereto by connecting rods or pitmans 107, 108, respectively. The crank pins 105, 106 are formed integral with crank members or arms 110, 111 connected to the remote ends of aligned shafts 112, 113 rotatably supported by suitable bearings 114, 115 in the frame F of the apparatus. The ends of the shafts 112, 113 adjacent to one another are connected by suitable couplings to oppositely projecting stud shafts of a gear reducer 116 driven by an electric motor 117, sometimes herein referred to as the "index" motor. The gear reducer 116 preferably includes an electric brake of the capacitator type. Alternatively, the oscillatable conveyor or tipple assembly H could be oscillated to index the outfeed mechanism from deck to deck of the conveyor section B in a manner similar to that in which the corresponding parts of the apparatus shown in the previously mentioned patents are reciprocated, or in any other suitable manner. The oscillatable conveyor or tipple apparatus H includes a counterweight assembly designated generally by the reference character 118 and not described in detail. Opposite sides of the frame of the feed section D are shown provided with removable covers 119.

As previously mentioned the feed section of the apparatus just described is preceded by the power actuated transfer section or conveyor table B which in the present instance is of the endless belt-type, comprising a plurality of endless belts 121 reeved about suitable pulleys 122, 123 fixed to rotatable shafts 124, 125, respectively, which shafts are in turn rotatably supported by suitable bearings adjacent to opposite ends of the frame of the transfer section. The frame of the transfer section C may be formed integral with and as a part of the frame of the feed section D if desired or it may be separate therefrom.

The shaft 124 and in turn the belts 121 are adapted to be driven by an electric gear motor 126 connected thereto by a sprocket chain drive including a sprocket chain 127 encircling a driving sprocket 128 connected to the output shaft of a gear reducer connected to and forming part of an electric motor 126 and a driven sprocket 129 keyed to shaft 124. The shafts 124, 125 are connected and driven in unison by the belts 121 and a sprocket chain 130 reeved about a sprocket 131 keyed to the shaft 124 and a sprocket 132 keyed to the shaft 125. The upper part of the frame may be provided with a hard wood or other suitable top, not shown, upon which the upper reaches of the belts 121 are supported and slide. The lower reaches of the belt 121 are supported on suitable idler pulleys one or more of which associated with each belt may be adjustably connected to the frame to provide for adjusting the tension of the belts. The upper reach of the sprocket chain 130 is supported in a channel member 134 extending lengthwise of the direction of travel of the sprocket chain and the underreach is supported by an adjustable idler sprocket.

The belt 121 nearest the infeed mechanism or pinch rolls is relatively close to the bottom roll 30 thereof and the transfer section or conveyor table C extends beyond each end of the roll. The extension of the conveyor to the near side, as viewed in FIG. 3, which is the feed end of the conveyor, is greater than its extension to the rear. Loads or charges of veneers are assembled on the conveyor table C preparatory to being fed to the multiple deck apparatus, which in the present instance is the conveyor section B.

Assuming that the veneers to be dried are brought to the entrance end of the conveyor table C in stacks, the stacks are successively loaded onto the conveyor belts 121 one veneer at a time. The first stack to be loaded is arranged adjacent to the entrance end of the conveyor cable with the veneers extending transversely of the direction of the lengths of the belts 121 of the table. With the stack arranged in the aforesaid manner, the veneers are laid in tandem relation upon the conveyor belts 121 by an operator or operators standing at one or opposite sides of the transfer or conveyor table at its entrance or loading end, that is adjacent to one or both ends of the veneers. The belts 121 are preferably continuously driven at an appropriate speed and the operator or operators arrange the veneers thereon in side-by-side relation. A pedal switch 140 is preferably provided, accessible to an operator, for stopping the motor 126 and in turn the movement of the belts 121 in the event the operator or operators are unable for some reason to keep the conveyor properly loaded or supplied with veneers as the veneers thereon move away from the loading end.

The operation of loading the transfer or conveyor table C continues until a trip on the sprocket chain 130 strikes a normally closed limit switch 141 located adjacent to the far end of the infeed mechanism or rolls, as viewed in FIG. 3, indicating that a full load or charge of veneers has been assembled upon the conveyor or transfer table. Alternatively the switch 141 could be tripped by the leading veneer. As the veneers are carried by the conveyor belts 121 from the entrance end of the conveyor toward the other end, the right-hand ends of the veneers, as viewed in FIGS. 1, 3 and 4 extend between the top and bottom roll assemblies at the infeed end of the feed section D and are in position to be engaged between the rolls 30, 31 upon actuation of the lever assembly 45 in a counter-clockwise direction as viewed in FIG. 4, to bring the rolls 31 carried thereby into engagement with the top of the veneers and press them against the driven roll 30. A guide plate 142 is provided along the right hand end of the transfer table as viewed in FIG. 3 to prevent the end of veneers overhanging the belt 121 closest to the roller 30 from dropping down as the veneers are carried to the roller 30.

Assuming that the power switch 144 has been closed connecting the power lines $L_1$, $L_2$, $L_3$ to the wires 145, 146, 147, that the "on" switch 148 has been closed, the operating solenoid 152 of the motor controller 153 will be energized and the motor 40 which drives the bottom rolls 30 and 91 will be operating. The operating solenoid 155 of the motor controller 156 for the transfer table motor will also be energized assuming the normally closed contacts 157, 158 of the pedal switch 140 are closed. Upon a full charge of veneer being assembled on the conveyors of the transfer table C the trip of the sprocket chain 130 or the leading veneer as the case might be will engage the limit switch 141 and actuate it to open its normally closed contacts 160, 161 to stop the conveyor belts 121 of the transfer table C. Simultaneously with the opening of the normally closed contacts 160, 161 of limit switch 141, its normally open contacts 162, 163 thereof are closed establishing a circuit for the operating solenoid 165 of relay 166 closing its normally open contacts 167, 168. The closing of contacts 167 performs no function at this time. The closing of contacts 168 establishes a holding circuit for relay 166 through normally closed contacts 170 of motor controller 156 for the transfer motor 126 around contacts 162, 163 of limit switch 141 when the contacts open as the charge of veneers leaves the transfer table the relay 166 is thus maintained energized and its normally open contacts 168 closed subsequent to the opening of contacts 162, 163 of switch 141 until the transfer motor 126 is reenergized as is later explained.

With the apparatus in the condition just explained, a feeding cycle or operation will be initiated upon the next actuation of a normally open cycle switch 170, which is periodically closed by a suitable trip on a rotatable disk located within and forming a part of a suitable cycle timer 171 driven in timed relation to the speed of dryer and feed section conveyors by a sprocket chain drive including a sprocket chain 172 reeved about a sprocket wheel 173 keyed to the input shaft of the timer and a sprocket connected to one of the rollers of the lower conveyor section deck 23. The timer 171 includes a variable speed drive so that the actuation of the cycle switch 170, with respect to the distance traveled by the conveyors of the conveyor section B can be adjusted or changed to suit various conditions of operation, such as, a change in the length, character, thickness, etc., of the veneers being dried.

Actuation of the cycle switch 170 closes its normally open contacts 175, 176 and establishes a circuit to the operating solenoid 180 of a time delay relay 181 closing its instant close contacts 182 establishing therethrough and through its delayed opening contacts 183 a circuit to the operating solenoid 184 of a time delay relay 185 and to the operating solenoid 186 of the motor controller 187 for index motor 117. Simultaneously, a normally open pair of holding contacts 188 in the motor controller 187 for index motor 117 are closed completing a holding circuit through a normally closed index limit or control switch 190 for the relay 185 and for the motor controller 187 for the motor 117. At the time the time delay relay 181 was energized to close its normally open contacts 182 and initiate operation of the index motor 117, index limit switch 190 was open since it was resting on the trip 191 of the index cam 192 but the trip moved away from the limit switch upon initial actuation of the motor 117 and before the delayed opening contacts 183 of time delay relay 181 opened, thereby establishing the holding circuit referred to for time delay relay 184 and the index motor 117 prior to the opening of the delayed opening contacts 183 of time delay relay 181. The capacitator brake 195 for index motor 117, not being applied at this time, the motor begins to rotate a direction to index the oscillatable conveyor or tipple assembly H to the next deck. Shortly thereafter the delayed opening contacts 183 of time delay relay 181 open. The energization of relay 185 simultaneously with the energization of the operating solenoid 186 of the motor controller 187 for the index motor opened its instant open instant close normally closed contacts 196, closed its instant closed delayed opening normally open contacts 197 and opened its delayed close normally closed contacts 198. Contacts 196 and 197 are in series circuit with one another therefore the actuation of relay 185 performed no function or operation.

The various parts of the apparatus or equipment shown are in the positions which they occupy immediately following the feeding of a charge of veneer to the top deck 20 of the conveyor section B. When the conveyor assembly reaches the next deck, which in this instance will be deck 21 of the conveyor section B, a trip 200 on the index control cam 192 opens index limit switch 190 thus braking the holding circuit for time delay relay 185 and index motor 117 and the motor stops with the outfeed rolls 91, 92 in position to feed decks 21 of the conveyor section B. Upon de-energization of time delay relay 185, its normally closed contacts 196 close establishing a circuit through the delayed opening contacts 197 thereof and normally closed interlock contacts 201 of the motor controller 187 to the operating solenoid 202 of the capacitator brake for index motor 117 applying the brake. Simultaneously, interlock contacts 203 in series with the control solenoid 186 of the motor controller 178 are opened and a circuit is established through the operating solenoid 205 of the air valve which controls the flow of air to the reciprocating-type fluid actuator motor 70, 71 actuating the motors to pull or to allow the lever assembly 45 to drop down and cause the upper set of feed rolls 31 to engage the veneers extending over the lower roller feed roll 30 whereupon the charge of veneers is caused to move over the feed conveyor or tipple assembly to the discharge rolls 91, 92 and onto the deck 21 of the feed section. After a predetermined time the length of which is adjusted for the length of the veneers being fed, the delayed opening normally open contacts 197 of the time delay relay 187 open thereby de-energizing the capacitator brake for index motor 117 and reversing the direction of flow of fluid to the fluid actuator motors 70, 71, whereupon the upper rolls 31 are again raised and the feed conveyor or tipple assembly D reconditioned for the reception of a new charge of veneers.

After the elapse of a predetermined time subsequent to the stopping of the index motor 117 and de-energization of the time delay relay 185, normally closed contacts 198 close establishing a circuit to the operating solenoid 210 of time delay relay 211 closing its instant close contacts 212 thereby establishing a circuit through its delayed opening contacts 213 and pedal switch 140 to the operating solenoid 155 of the motor controller 156 for the transfer motor 126. Upon energization of the transfer motor, the motor starts and normally open holding contacts 215 in the motor controller close. The trip on sprocket chain 130 moves away from limit switch 141 whereupon its normally closed contacts 160, 161 reclose and its normally open contacts 162, 163 reopen. The reclosing of contacts 162, 163 establishes a holding circuit for the motor through the now closed contacts 215 of motor controller. In the event the switch 141 is under the control of the veneer the normally closed contacts 160, 161 reclosed and the normally open contacts 162, 163 reopened upon the veneer moving away from the switch 141.

Shortly after the establishment of the holding circuit for the transfer motor, the delayed opening contacts 212 of time delay relay 211 open. The transfer motor 126 continues to operate until the limit switch 141 is again operated. The operator, however, can stop the motor anytime by opening the pedal switch 140. Simultaneously, with the closing of the normally open contacts 215 of motor controller 156 for the transfer motor 126, the normally closed contacts 170 thereof open thus breaking the holding circuit for the relay 166 allowing its normally open contacts 167 to open thereby assuring that the upper set of pinch rolls 31 will not be lowered into engagement with veneer moved thereunder by the transfer table until subsequent actuation of the limit switch 141. Upon reactuation of the switch 141 to reopen its normally closed contacts 160, 161 and close its normally open contacts 162, 163, the cycle of operation referred to is repeated.

In the preferred embodiment the transfer section or table C comprises a single set of conveyor belts 121 extending across the front or entrance end of the feed section D. Two conveyors or two sets of belts could be substituted for the single set of belts shown, both feeding approximately the center of the feed section. In this event, one of the conveyor sections could be loaded by an operator at one side of the feed section and the other by an operator at the other side of the feed section. In this way the loading could be expedited, as the loading could be performed from two stacks at opposite sides of the transfer section.

Reference to the cam or trip wheel 192 will show that it contains four trips, one for each of the four decks of the multiple-deck conveyor section B. The index trip wheel 192 rotates in a clockwise direction, as viewed in FIG. 4. Trip 191 actuated the index limit switch 190 upon the feed conveyor or tipple H assembly aligning with the upper deck 20 of the conveyor section B. The next trip 200 upon the tipple aligning with the deck 21, the third trip 220 upon the tipple aligning with the deck 22 and the fourth trip upon the tipple aligning with the bottom deck 23. The trips are preferably adjustably secured to the index wheel 192 so that they can be positioned for conveyor sections having different numbers of decks and/or feeding the decks in different sequences, for example, alternative decks and/or in the reverse order, that is, from bottom to top rather than from top to bottom.

While the preferred embodiment of the invention has been described in considerable detail it is to be understood that the invention is not limited to the equipment shown but may be otherwise embodied and that the control and operating mechanisms might be quite different from those shown, for example, as previously mentioned, the indexible or vertically oscillatable conveyor or tipple may be reciprocated by cam means or an electric motor connected thereto and controlled in a manner similar to the oscillating and indexible mechanisms shown in the aforementioned patents. Alternatively, the conveyor section may be oscillated similar to that shown in the patents to Fields No. 3,011,619 and Ensley, et al. No. 3,080,958 instead of incorporating an oscillatable conveyor or tipple in the feed section.

It is also to be understood that while in the preferred embodiment the indexing of the oscillatable conveyor or tipple immediately precedes the actuation of the feed mechanism to perform a feeding operation upon the initiation of a feed cycle by the closing of the cycle switch, the reverse could be employed. It is also to be understood that the feed cycle could be initiated and the relative indexing between the feed section and the conveyor sections could be controlled in any of the manners shown in the aforesaid patents, including Fields, No. 3,011,619.

In order to adopt the equipment for feeding veneers of different lengths, for example, 4, 6, 8, 10 etc. feet, the cycle switch could be adjusted to operate upon approximately every two feet of travel of the conveyors of the conveyor section and a stepping switch employed to count the switch impulses and initiate a feed cycle only upon the occurrence of a predetermined number of impulses, for example, 2, 3, 4, etc. It is also to be understood that the cam in the cycle timer may be so constructed as to maintain one or more of the operating circuits described closed a predetermined time instead of using a time delay relay as employed in the preferred embodiment.

From the foregoing it will be apparent that the objects of the invention heretofore enumerated and others have been accomplished and that there has been provided novel and improved equipment for feeding veneers, or in fact any similar sheet material, to a multiple deck apparatus in predetermined sequence and/or in predetermined spaced relation or time intervals. As previously stated, the invention is not limited to the equipment shown and it is the intention to cover hereby all adaptations, modifications and use thereof including those heretofore mentioned which come within the practice of those skilled in the art in which the invention relates and to the scope of the appended claims.

Having thus described my invention, what I claim is:

1. In equipment for feeding veneers to power driven conveyor means operating to move veneers thereon at a predetermined speed, feed means locatable adjacent to one end of conveyor means to be fed, said feed means comprising roll means located one above the other, power means for driving at least one of said roll means, power driven conveyor means at the side of said feed means opposite to the side locatable adjacent to the conveyor means to be fed for conveying veneers lengthwise of said roll means with their one ends between said roll means, and means adapted for periodically actuating said feed means in timed relation to the operation of the conveyor means to be fed to cause said feed means to feed veneers on said conveyor means the ends of which are between said roll means to the conveyor means to be fed.

2. In equipment for feeding veneers to power driven conveyor means operating to move veneers thereon at a predetermined speed, feed means adapted to be located adjacent to one end of conveyor means to be fed, said feed means comprising vertically spaced roll means, means for driving at least one of said vertically spaced roll means, power means for producing relative movement of said vertically spaced roll means toward and from one another, power driven conveyor means at the side of said feed means opposite to the side adapted to be located adjacent to the conveyor means to be fed and extending lengthwise of said roll means for conveying veneers lengthwise of said roll means with their one ends between said vertically spaced roll means, and means adapted for periodically actuating said first-mentioned power means in timed relation to the operation of the conveyor means being fed to cause said feed means to feed veneers on said conveyor means the ends of which are between said roll means to the conveyor means being fed.

3. In equipment for handling veneers, power driven first conveyor means, power means for operating said first conveyor means to move veneers thereon at a predetermined speed, feed means comprising roll means extending transversely across one end of said first conveyor means, power driven second conveyor means at the side of said feed means opposite to said first conveyor means and extending transversely of said first conveyor means for conveying veneers lengthwise of said roll means with their one ends between said roll means, and means for periodically actuating said feed means in timed relation to the operation of said first conveyor means to cause said feed means to transfer veneers on said second conveyor means the ends of which are between said roll means to said first conveyor means.

4. In equipment for handling veneers, power driven first conveyor means, power means for operating said first conveyor means to move veneers thereon at a predetermined speed, feed means extending transversely of and located adjacent to one end of said first conveyor means, said feed means comprising roll means spaced one above the other, power means for driving at least one of said roll means, power driven second conveyor means at the side of said feed means opposite to said first conveyor means and extending transversely of said first conveyor means for conveying veneers lengthwise of said roll means with their one ends between said vertically spaced roll means, means for periodically actuating said feed means in timed relation to the operation of said first conveyor means to cause said feed means to transfer veneers on said second conveyor means the ends of which are between said roll means to said first conveyor means.

5. In equipment for handling veneers, power driven first conveyor means, power means for operating said first conveyor means to move veneers thereon at a predetermined speed, feed means extending transversely of and located adjacent to one end of said first conveyor means, said feed means comprising vertically spaced roll means positioned one above the other, power means for driving at least one of said roll means, power means for effecting movement of said vertically spaced roll means toward one another, power driven second conveyor means at the side of said feed means opposite to said first conveyor means and extending transversely of said first conveyor means for conveying veneers lengthwise of said roll means with their one ends between said vertically spaced roll means; means for periodically actuating said second last-mentioned power means in timed relation to the operation of said first conveyor means to cause said feed means to transfer veneers on said second conveyor means the ends of which are between said roll means to said first conveyor means.

6. In equipment for sequentially feeding veneers to a plurality of tiered power driven conveyors, feed means locatable adjacent to one end of the tiered conveyors to be fed, said feed means comprising roll means located one above the other, power means for driving at least one of said roll means, power driven conveyor means at the side of said feed means opposite to the side locatable adjacent to the tiered conveyors to be fed for conveying veneers lengthwise of said roll means with their one ends between said roll means, means adapted for sequentially aligning the tiered conveyors and said feed means, and means adapted for periodically actuating said feed means in timed relation to the operation of said last-named means to cause said feed means to feed veneers on said conveyor means the ends of which are between said roll means to the tiered conveyors to be fed.

7. In equipment for sequentially feeding veneers to a plurality of tiered power driven conveyors operating to move veneers thereon at a predetermined speed, feed means locatable adjacent to one end of the plurality of tiered conveyors to be fed, said feed means comprising roll means located one above the other, power means for driving at least one of said roll means, power driven conveyor means at the side of said feed means opposite to the side locatable adjacent to the tiered conveyors to be fed for conveying veneers lengthwise of said roll means with their one ends between said roll means, means adapted for sequentially aligning the tiered conveyors and said feed means, and means adapted for periodically actuating said last-named means and said feed means in timed relation to the operation of the conveyors to be fed to cause said feed means to feed veneers on said conveyor means the ends of which are between said roll means to the tiered conveyors sequentially.

8. In equipment for sequentially feeding veneers to a plurality of tiered power driven conveyors operating to move veneers thereon at a predetermined speed, feed means adapted to be located adjacent to one end of the conveyors to be fed, said feed means comprising vertically spaced roll means, means for driving at least one of said vertically spaced roll means, power means for producing relative movement of said vertically spaced roll means toward and from one another, power driven conveyor means at the side of said feed means opposite to the side adapted to be located adjacent to the conveyors to be fed and extending lengthwise of said roll means for conveying veneers lengthwise of said roll means with their one ends between said vertically spaced roll means, means adapted for sequentially aligning the tiered conveyors and said feed means, and means adapted for periodically actuating said first-mentioned power means and said last-mentioned power means in timed relation to one another and to the operation of the conveyors being fed to cause said feed means to feed veneers on said conveyor means the ends of which are between said roll means to the conveyors sequentially.

9. In equipment for handling veneers, a plurality of tiered power driven conveyors, power means for operating said conveyors to move veneers thereon, feed means comprising roll means extending transversely across one end of said conveyors, power driven conveyor means at the side of said feed means opposite to said conveyors and extending transversely of said conveyors for conveying veneers lengthwise of said roll means with their one ends between said roll means, means for sequentially aligning the tiered conveyors and said feed means, and means for periodically actuating said last-named means and said feed means in timed relation to one another to cause said feed means to transfer veneers on said conveyor means the ends of which are between said roll means to said conveyors sequentially.

10. In equipment for handling veneers, a plurality of power driven conveyors, power means for operating said conveyors to move veneers thereon at a predetermined speed, feed means extending transversely of and located adjacent to one end of said conveyors, said feed means comprising roll means positioned one above the other, power means for driving at least one of said roll means, power driven conveyor means at the side of said feed means opposite to said first conveyors and extending transversely of said conveyors for conveying veneers lengthwise of said roll means with their one ends between said vertically spaced roll means, means for sequentially aligning the tiered conveyors and said feed means, and means for periodically actuating said last-mentioned power means in timed relation to the operation of said first conveyor means to cause said feed means to transfer veneers on said second conveyor means the ends of which are between said roll means to said first conveyor means.

11. In equipment adapted to be located adjacent to one end of tiered conveyors to be fed, feed means comprising roll means located one above the other, power means for driving at least one of said roll means, power driven conveyor means at one side of said feed means for conveying veneers lengthwise of said roll means with their one ends between said roll means, tipple means extending to the side of said feed means opposite to said conveyor means, means for vertically oscillating the end of said tipple means remote from said feed means, and means adapted for periodically actuating said feed means in timed relation to the operation of said last-named means to cause said feed means to feed veneers on said conveyor means the ends of which are between said roll means to the tiered conveyors sequentially.

12. In equipment adapted to be located adjacent to a plurality of tiered power driven conveyors operating to move veneers thereon at a predetermined speed, feed means comprising roll means located one above the other, power means for driving at least one of said roll means, power driven conveyor means at one side of said feed means for conveying veneers lengthwise of said roll means with their one ends between said roll means, tipple means extending to the side of said feed means opposite to said conveyor means, means for vertically oscillating the end of said tipple means remote from said feed means, and means adapted for periodically actuating said second named means and said last-named means in timed relation to the operation of the conveyors to be fed to cause said feed means to feed veneers on said conveyor means the ends of which are between said roll means to the tiered conveyors sequentially.

13. In equipment adapted to be located adjacent to one end of a plurality of tiered conveyors to be fed, feed means comprising roll means normally spaced one above the other, power means for driving at least one of said roll means, power means for effecting relative movement of said spaced roll means toward one another, power driven conveyor means at one side of said feed means for conveying veneers lengthwise of said roll means with their one ends between said roll means, tipple means extending to the side of said feed means opposite to said conveyor means, means for vertically oscillating the end of said tipple means remote from said feed means, and means adapted for periodically actuating said second-mentioned power means in timed relation to the operation of said last-named means to cause said feed means to feed veneers on said conveyor means the ends of which are between said roll means to the tiered conveyors.

14. In equipment adapted to be located adjacent to one end of a plurality of tiered conveyors operating to move veneers thereon at a predetermined speed, feed means comprising roll means normally spaced one above the other, power means for driving at least one of said roll means, power means for effecting relative movement of said spaced roll means toward one another, power driven conveyor means at one side of said feed means for conveying veneers lengthwise of said roll means with their one ends between said roll means, tipple means extending to the side of said feed means opposite to said conveyor means, means for vertically oscillating the end of said tipple means remote from said feed means, and means adapted for periodically actuating said last-named means and said feed means in timed relation to the operation of the conveyors to be fed to cause said feed means to feed veneers on said conveyor means the ends of which are between said roll means to the tiered conveyors sequentially.

15. In equipment for handling veneers, a plurality of tiered power driven conveyors, power means for operating said conveyors to move veneers thereon, adjacent to one end of said conveyor feed means comprising roll means extending transversely of the length of said conveyors, power driven conveyor means at the side of said feed means opposite to said conveyors and extending transversely of the length of said conveyors for conveying veneers lengthwise of said roll means with their one ends between said roll means, tipple means extending to the side of said feed means opposite to said conveyor means, means for vertically oscillating the end of said tipple means remote from said feed means, and means for periodically actuating said last-named means and said feed means in timed relation to one another to cause said feed means to transfer veneers on said conveyor means the ends of which are between said roll means to said conveyors sequentially.

References Cited by the Examiner

UNITED STATES PATENTS

| 2,883,033 | 4/1959 | Armstrong | 198—313 |
| 3,171,531 | 3/1966 | Keeney | 198—31 |

FOREIGN PATENTS 659,987  3/1926  Canada.

EVON C. BLUNK, *Primary Examiner.*

WILLIAM B. LA BORDE, *Examiner.*

R. E. AEGERTER, *Assistant Examiner.*